(12) United States Patent
Kim

(10) Patent No.: US 8,733,514 B2
(45) Date of Patent: May 27, 2014

(54) ELECTRONIC WEDGE BRAKE APPARATUS

(75) Inventor: Jongsung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 772 days.

(21) Appl. No.: 12/868,576

(22) Filed: Aug. 25, 2010

(65) Prior Publication Data

US 2011/0056776 A1  Mar. 10, 2011

(30) Foreign Application Priority Data

Sep. 8, 2009 (KR) .................. 10-2009-0084300

(51) Int. Cl.
*F16D 55/08* (2006.01)

(52) U.S. Cl.
USPC ...................................... 188/72.7; 188/70 B

(58) Field of Classification Search
USPC .......... 188/70 R, 70 B, 72.1, 72.2, 72.6, 72.7, 188/73.1, 156, 158
See application file for complete search history.

(56) References Cited

U.S. PATENT DOCUMENTS

| 8,151,947 B2* | 4/2012 | Park ............................. 188/72.7 |
| 8,151,948 B2* | 4/2012 | Cheon ......................... 188/72.7 |
| 2008/0314695 A1* | 12/2008 | Kim .............................. 188/72.7 |
| 2009/0101453 A1* | 4/2009 | Baier-Welt et al. .......... 188/72.7 |
| 2010/0012441 A1* | 1/2010 | Baier-Welt et al. .......... 188/72.7 |
| 2010/0147633 A1* | 6/2010 | Kim .............................. 188/72.7 |
| 2011/0139554 A1* | 6/2011 | Kim .............................. 188/71.8 |

\* cited by examiner

*Primary Examiner* — Bradley King
*Assistant Examiner* — Nicholas J Lane
(74) *Attorney, Agent, or Firm* — Knobbe Martens Olson & Bear LLP

(57) ABSTRACT

The present invention makes it possible to increase safety of parts and ensure durability and smooth operability in braking by increasing axial stiffness of a motor while keeping the spring effect of connecting springs driving an upper wedge with force from the motor.

6 Claims, 6 Drawing Sheets

ELECTRONIC WEDGE BRAKE APPARATUS

CROSS-REFERENCE TO RELATED APPLICATIONS

The present application claims priority to Korean Patent Application Number 10-2009-0084300 filed Sept. 8, 2009, the entire contents of which application is incorporated herein for all purposes by this reference.

BACKGROUND OF THE INVENTION

1. Field

The present disclosure relates to an electronic wedge brake apparatus, in more detail, an electronic wedge brake apparatus for ensuring stable operability of an electronic wedge brake and improving durability.

2. Description of Related Art

In order to brake a front wheel of a vehicle at relatively low voltage of 12V, as shown in FIGS. 1 and 2, an electronic wedge brake apparatus using a self-servo effect has been proposed.

In this apparatus, with a fixed lower wedge 500 as a base, when a connecting spring 504 moves an upper wedge 506 along an inclined surface supported to a roller 508 by converting rotational force of a motor 502 into straight movement force, a brake disc 512 is pressed between an inner pad 510 and an outer pad 514 and rotational force of brake disc 512 is applied to upper wedge 506 to be further rotated, in which the rotational force further moves upper wedge 506 along the inclined surface supported to roller 508, such that a self-servo effect pressing brake disc 512 is generated.

When braking in the front direction, the self-servo effect is achieved by moving upper wedge 506 to the right along the inclined surface in FIG. 1, and when braking in the rear direction, the self-servo effect is achieved by moving upper wedge 506 to the left along the inclined surface. In this configuration, connecting spring 504 necessarily bends for the braking in the rear direction. As such, the connecting spring 504 needs to be flexible like a leaf spring and also stiff enough to endure the pressing force in the axial direction of motor 502.

However, as the stiffness of connecting spring 504 increases, the spring function becomes less effective. Also, if the spring is too flexible, the spring may not be stiff enough. Therefore, rear braking may be difficult or connecting spring 504 may be broken by buckling in front braking.

The information disclosed in this Background of the Invention section is only for enhancement of understanding of the general background of the invention and should not be taken as an acknowledgement or any form of suggestion that this information constitutes prior art.

SUMMARY

Various aspects of the present invention are directed to provide an electronic wedge brake apparatus that makes it possible to increase safety of parts and ensure durability and smooth operability in braking, by increasing axial stiffness of a motor while keeping the spring effect of connecting springs driving an upper wedge with force from the motor.

An aspect of the present invention provides an electronic wedge brake apparatus, which includes a connector converting rotational force of a motor into straight movement force; connecting springs having an end connected to an upper wedge and the other end connected to the connector; and support members extending from the connector toward the upper wedge to support the opposite surface to the surface facing the upper wedge of the connecting springs.

The moving angle of the upper wedge may be larger than the mounting angle of the motor and the difference is set within 10°.

The moving angle of the upper wedge may be set to be the same as the mounting angle of the motor, and the upper wedge may be further provided with additional support members extending toward the connector to support the surfaces facing the upper wedge of the connecting springs.

In this configuration, the support members and the additional support members may be formed in a size to overlap each other, with the connecting springs therebetween.

The present invention makes it possible to increase safety of parts and ensure durability and smooth operability in braking by increasing axial stiffness of a motor while keeping the spring effect of connecting springs driving an upper wedge with force from the motor.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
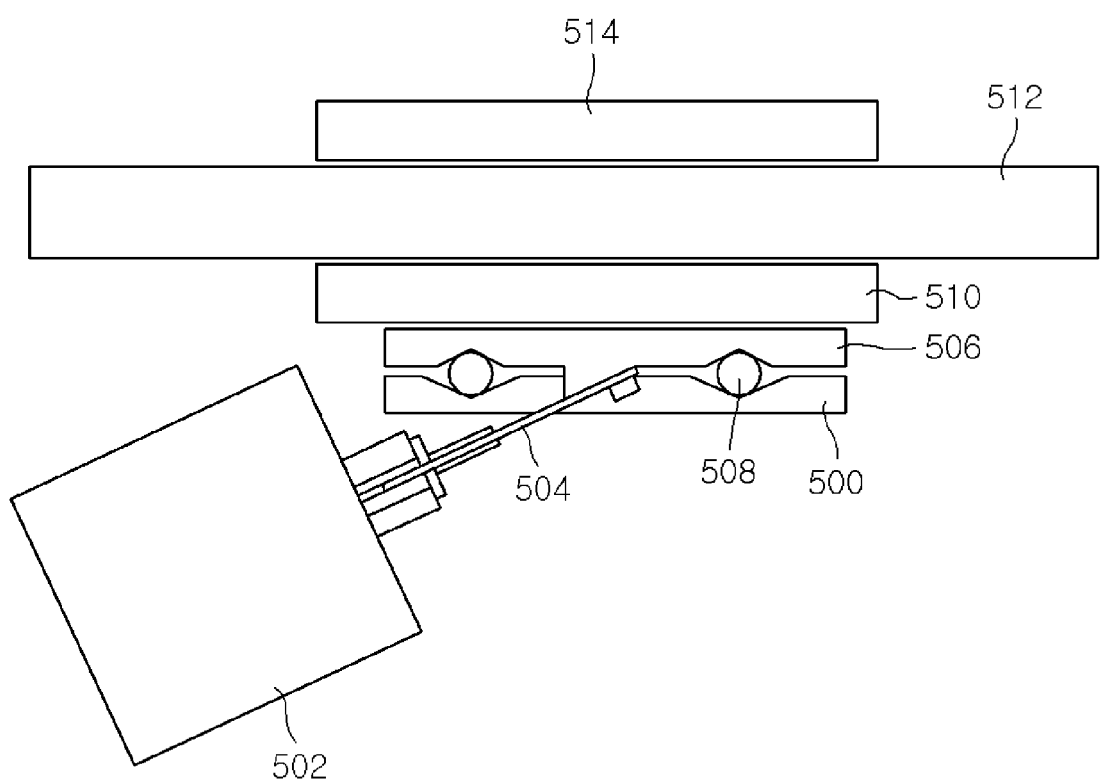
FIGS. 1 and 2 are views illustrating an electronic wedge brake apparatus.
Figure 2:
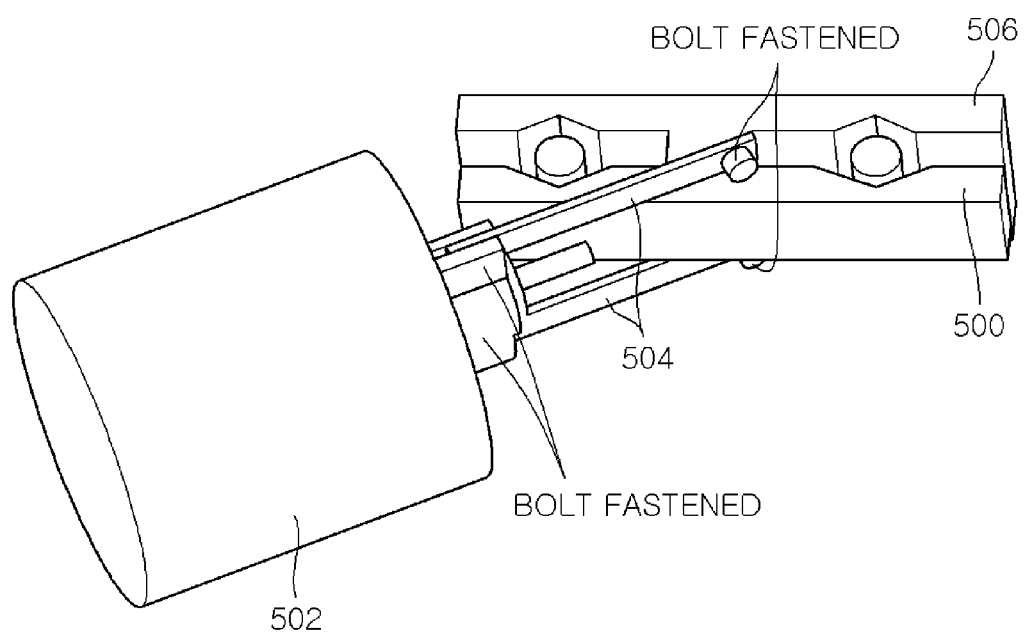
Figure 3:
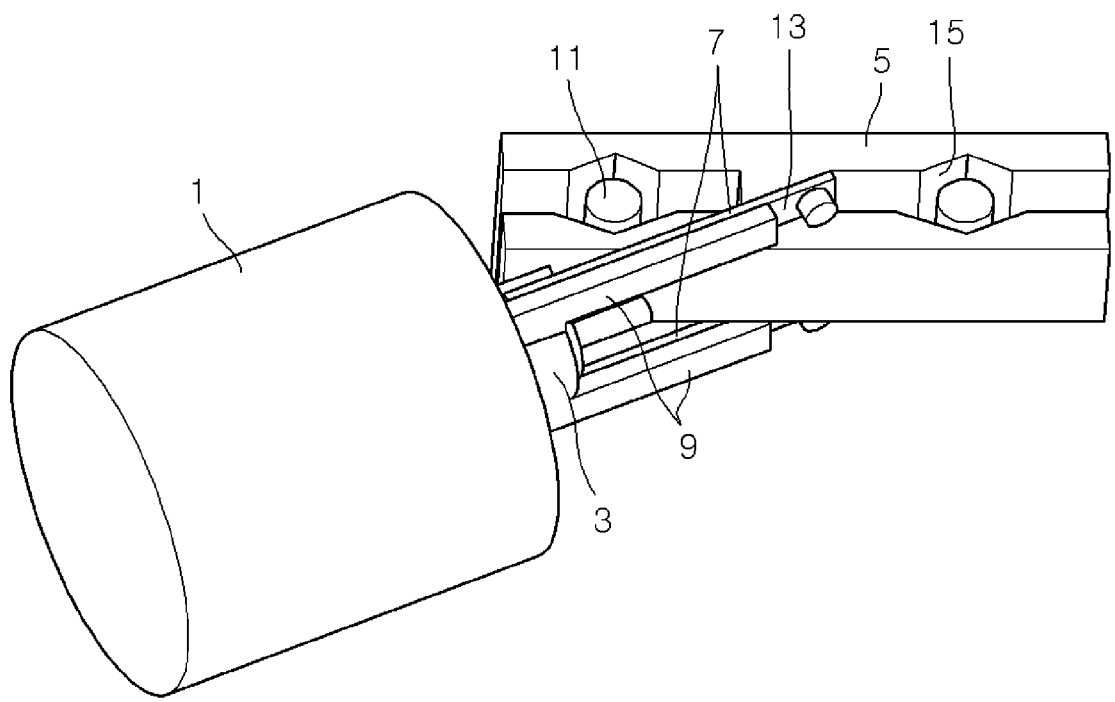
FIG. 3 is a view showing an electronic wedge brake apparatus according to an embodiment of the present invention.

Referring to FIG. 3, an embodiment of the present invention includes a connector 3 converting rotational force of a motor 1 into straight movement force; connecting springs 7 having an end connected to an upper wedge 5 and the other end connected to connector 3; and support members 9 extending from connector 3 toward upper wedge 5. The connecting springs 7 are bolted to the upper wedge 5.

In the embodiment of FIG. 3, two connection springs 7 are provided. Each connecting spring 7 includes an elongated strip portion having two opposite surfaces. As illustrated, one of the surfaces faces the upper wedge 5, and the other surface 13 faces away from the upper wedge 5. One support member 9 is provided on the surface 13 to support the spring 7.

According to embodiments, the moving angle of upper wedge 5 is larger than the mounting angle of motor 1 and the difference is set within 10°. In the foregoing configuration, the upper wedge 5 is configured to move along its inclined surface 15 whereas the connecting spring 7 moves along the axial direction of the motor 1, which has to do with mounting angle of the motor 1. As such, with reference to a reference plane or line, the moving angle of upper wedge 5 is the same as the angle of the inclined surface supported by a roller 11; and the mounting angle of motor 1 is the same as the angle of the straight movement by connector 3 and the moving angle of the spring 7.

Figure 4:
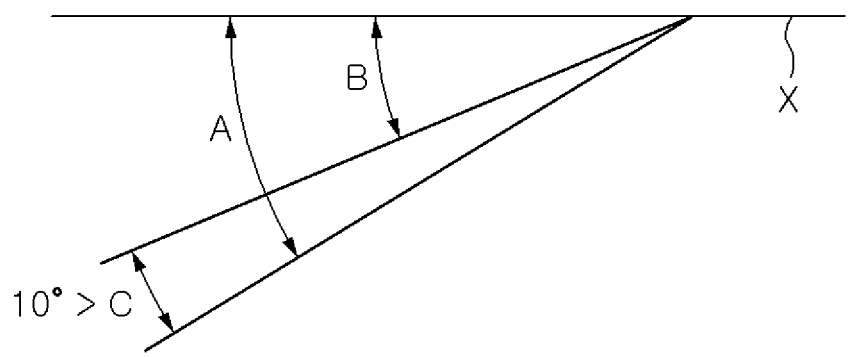
FIG. 4 is a view illustrating relationship in angle of the apparatus shown in FIG. 3.

Referring to FIG. 4, "X" is the reference plane or line, the moving angle of upper wedge 5 relative to the brake disc is A, and the mounting angle of motor 1 is B. According to embodiments, the difference between A and B is within 10°. In this configuration, if the moving angle of upper wedge 5 is set too much larger than the mounting angle of motor 1, the effect that connecting spring 7 is supported by support member 9; therefore, it is preferable that the difference is within 10°.

In the foregoing configuration, the motor 1 operates and the connecting springs 7 apply pressing force to upper wedge 5 at the angle B, which moves the upper wedge 5 at the angle A to perform front braking. Then, the connecting spring 7 may be forced in the opposite direction from the upper wedge 5, which could cause buckling of the spring 7 but for the support members 9. However, the support members 9 prevents such buckling from occurring. Thus, the connecting springs 7 can smoothly push upper wedge 5 with sufficient stiffness.

Further, as the possibility of buckling of connecting spring 7 is reduced, as described above, connecting springs 7 can be made of a more flexible material to flexibly bend in the rear braking, as described above, and smoothly pull upper wedge 5 by making connecting springs more flexible, and accordingly, it is possible to implement stable and smooth rear braking.

Figure 5:
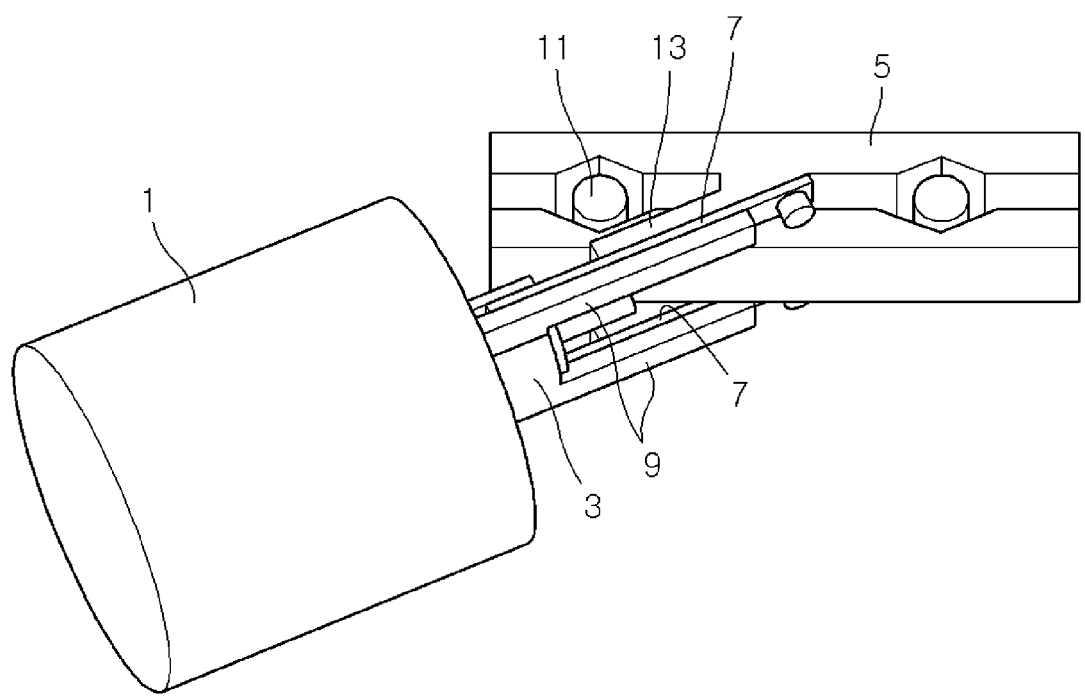
FIG. 5 is a view illustrating another embodiment of the present invention.

FIG. 5 is a view showing another embodiment of the present invention, the moving angle of upper wedge 5 is set to be the same as the mounting angle of motor 1, and other than support members 9 provided to connector 3, upper wedge 5 is further provided with additional support members 13 extending toward connector 3 to support the surfaces facing upper wedge 5 of connecting springs 7.

In this embodiment, since support members 9 and additional support members 13 are formed in a size to overlap each other, with connecting springs 7 therebetween, there is no section at any one side over the entire length which is not supported by support members 9 or additional support members 13 in connecting spring 7.

As described above, when the moving angle of upper wedge 5 is set to be the same as the mounting angle of motor 1, connecting springs 7 may buckle toward upper wedge 5. Accordingly, connecting springs 7 are supported by additional support members 13 to prevent the buckling.

Figure 6:
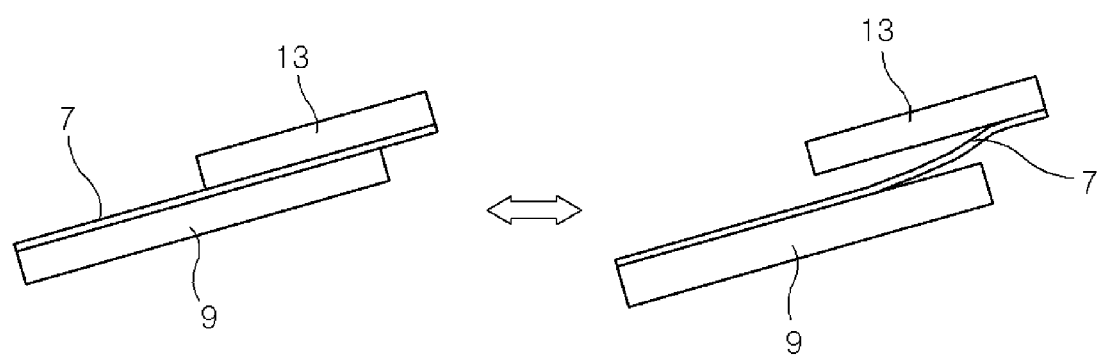
FIG. 6 is a view illustrating the operation of the embodiment shown in FIG. 5.

FIG. 6 illustrates bending of a connecting spring 7 while being supported by the support members 9 and additional support members 13. The support members 9 and additional support members 13 appropriately support connecting springs 7 to prevent them from buckling in the front braking, and connecting springs 7 smoothly deform and upper wedge 5 smoothly moves in the rear braking, such that it is possible to achieve smooth and stable operability in the rear braking.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic wedge brake apparatus, comprising:
   a fixed wedge;
   a movable wedge movable relative to the fixed wedge and further relative to a brake disk;
   a motor configured to generate rotational force;
   a connector configured to convert rotational force of the motor to linear force;
   a connecting spring interconnecting the connector and the movable wedge, the connecting spring configured to pass the linear force from the connector to the movable wedge, the connecting spring comprising a first surface facing the movable wedge and a second surface facing away from the movable wedge;
   a support member extending from the connector toward the movable wedge and configured to support the second surface of the connecting spring; and
   an additional support member configured to support the first surface of the connecting spring, wherein the additional support member extends from the movable wedge toward the connector, wherein at least part of the connecting spring is located between the support member and the additional support member;
   wherein at least part of the connecting spring is located between the support member and the additional support member in a direction perpendicular to the first surface or the second surface.

2. The apparatus of claim 1, wherein the support member is configured to inhibit the connecting spring from buckling.

3. The apparatus of claim 1, wherein the movable wedge is configured to move in a first direction, the connecting spring is configured to move in a second direction, wherein the first and second directions are off at an angle which is smaller than 10°.

4. The apparatus of claim 1, wherein the movable wedge and the connecting spring are configured to move in substantially the same direction.

5. An electronic wedge brake apparatus, comprising:
   a connector converting rotational force of a motor into straight movement force;
   connecting springs, each having an end connected to an upper wedge and the other end connected to the connector and comprising a first surface facing the upper wedge and a second surface opposite to the first surface; and
   support members, each extending from the connector toward the upper wedge to support a second surface of one of the connecting springs,
   wherein the moving angle of the upper wedge is set to be the same as the mounting angle of the motor,
   wherein the upper wedge is further provided with additional support members, each of which extends toward the connector to support the first surface of one of the connecting springs
   wherein the support members and the additional support members are formed in a size to overlap each other when viewed in a direction perpendicular to the first surface,
   wherein each of the connecting springs is located between one of the support members and one of the additional support members.

6. The electronic wedge brake apparatus as defined in claim 5, wherein the moving angle of the upper wedge is larger than the mounting angle of the motor and the difference is set within 10°.

* * * * *